(12) United States Patent
Ogawa et al.

(10) Patent No.: US 8,385,459 B2
(45) Date of Patent: Feb. 26, 2013

(54) CYCLIC SHIFT SEQUENCE GENERATION METHOD, RADIO COMMUNICATION TERMINAL DEVICE, AND RADIO COMMUNICATION BASE STATION DEVICE

(75) Inventors: Yoshihiko Ogawa, Kanagawa (JP); Daichi Imamura, Kanagawa (JP); Kenichi Miyoshi, Kanagawa (JP); Takashi Iwai, Ishikawa (JP); Tomofumi Takata, Ishikawa (JP)

(73) Assignee: Panasonic Corporation, Osaka (JP)

( * ) Notice: Subject to any disclaimer, the term of this patent is extended or adjusted under 35 U.S.C. 154(b) by 568 days.

(21) Appl. No.: 12/665,012

(22) PCT Filed: Jun. 17, 2008

(86) PCT No.: PCT/JP2008/001559
§ 371 (c)(1),
(2), (4) Date: Dec. 16, 2009

(87) PCT Pub. No.: WO2008/155903
PCT Pub. Date: Dec. 24, 2008

(65) Prior Publication Data
US 2010/0195700 A1      Aug. 5, 2010

(30) Foreign Application Priority Data

Jun. 18, 2007   (JP) ................................. 2007-160347

(51) Int. Cl.
*H04L 27/00*   (2006.01)
(52) U.S. Cl. ...................................................... 375/295
(58) Field of Classification Search ................... 375/295
See application file for complete search history.

(56) References Cited

U.S. PATENT DOCUMENTS

2008/0168114 A1*  7/2008  Han et al. ...................... 708/209
2009/0305693 A1* 12/2009  Shimomura et al. ........ 455/422.1

OTHER PUBLICATIONS

International Search Report dated Sep. 22, 2008.
Huawei, "Multiple values of cyclic shift increment Ncs," TSG RAN WG1 Meeting #49, R1-072325, May 11, 2007, 5 pages.
LG Electronics, "Ways to Mitigate Frequency Offset with CAZAC Cyclic Shift," TSG RAN WG1 Meeting #47bis, R1-070227, Jan. 19, 2007, 8 pages.
Panasonic, NTT DoCoMo, "RACH Zadoff-Chu sequence definition and allocation," TSG RAN WG1 Meeting #48, R1-071111, Feb. 16, 2007, p. 1-3.
Pansonic, NTT DoCoMo, "Zadoff-Chu sequence allocation on RACH for complexity reduction," TSG RAN WG1 Meeting #47bis, R1-070189, Jan. 19, 2007, p. 1-4.
Panasonic, "RACH Preamble performance evaluation with frequency offset for E-UTRA," TSG RAN WG1 Meeting #47, R1-063181, Nov. 10, 2006, p. 1-10.
Huawei, Panasonic, "Specification of restricted set of cyclic shifts of root Zadoff-Chu sequences," TSG RAN WG1 Meeting #49bis, R1-072898, Jun. 29, 2007, 6 pages.

(Continued)

*Primary Examiner* — Juan A Torres
(74) *Attorney, Agent, or Firm* — Dickinson Wright PLLC

(57) ABSTRACT

Provided is a cyclic shift sequence generation method which can prevent coming of an interference wave into a desired wave detection window even if a cyclic shift sequence has a high mutual correlation in different bandwidths, thereby improving a channel estimation accuracy in a base station. In this method, a cyclic shift sequence number to be allocated to a cell is decided in advance. Moreover, when the cyclic shift amount between cyclic shift sequences allocated in cells is $\Delta 1$ and the cyclic shift amount of the cyclic shift sequences allocated between the cells is $\Delta 2$, $\Delta 1$ and $\Delta 2$ are made different when generating a cyclic shift sequence.

11 Claims, 13 Drawing Sheets

OTHER PUBLICATIONS

Huawei, Panasonic, "Specification of restricted set of cyclic shifts of root Zadoff-Chu sequences," TSG RAN WG1 Meeting #50, R1-073516, Aug. 24, 2007, 6 pages.

Motorola, "Uplink Reference Signal Multiplexing Structures for E-UTRA," TSG RAN WG1 Meeting #46bis, R1-062610, Oct. 9-13, 2006, p. 1-16.

Panasonic, "Narrow band uplink reference signal sequences and allocation for E-UTRA," TSG RAN WG1 Meeting #47, R1-063183, Nov. 6-10, 2006, p. 1-4.

Huawei, "Sequence Assignment for Uplink Reference Signal," TSG RAN WG1 Meeting #47, R1-063356, Nov. 6-10, 2006, 3 pages.

LG Electronics, "Binding method for UL RS sequence with different lengths," TSG RAN WG1 Meeting #48, R1-070911, Feb. 12-16, 2007, p. 1-4.

Texas Instruments, "Sounding Reference Signal Assignments in E-UTRA Uplink," TSG RAN WG1 #48bis, R1-071484, Mar. 26-30, 2007, p. 1-7.

* cited by examiner

CYCLIC SHIFT SEQUENCE GENERATION METHOD, RADIO COMMUNICATION TERMINAL DEVICE, AND RADIO COMMUNICATION BASE STATION DEVICE

CROSS-REFERENCE TO RELATED APPLICATIONS

This application is a 371 application of PCT/JP2008/001559 filed Jun. 17, 20012, which is based on Japanese Patent Application No. 2007-160347, filed on Jun. 18, 2007, each of which is incorporated herein by reference in its entirety.

TECHNICAL FIELD

The present invention relates to a cyclic shift sequence generating method, radio communication terminal apparatus and radio communication base station apparatus for generating cyclic shift sequences from a CAZAC (Constant Amplitude and Zero Auto-correlation Code) sequence such as a Zadoff-Chu sequence used as a reference signal.

BACKGROUND ART

In a radio communication system represented by the 3GPP LTE (3rd Generation Partnership Project Long-Term Evolution) system, studies are underway to adopt a Zadoff-Chu sequence (hereinafter "ZC sequence") having low inter-sequence correlation, low Peak to Average Power Ratio (PAPR) characteristic and flat frequency response characteristic, as a reference signal for channel estimation. This ZC sequence is a kind of a CAZAC sequence, and represented by following equation 1 in the time domain.

(Equation 1)

$$f_r(n) = \begin{cases} \exp\left\{\frac{-j2\pi r}{N}\left(\frac{n(n+1)}{2} + pk\right)\right\}, \\ \quad \text{when } N \text{ is odd}, \ n = 0, 1, \ldots, N-1 \\ \exp\left\{\frac{-j2\pi r}{N}\left(\frac{n^2}{2} + pk\right)\right\}, \\ \quad \text{when } N \text{ is even}, \ n = 0, 1, \ldots, N-1 \end{cases} \quad [1]$$

Here, N is the sequence length, r is the ZC sequence number in the time domain, and N and r are coprime. Also, p is an arbitrary integer (generally p=0). Although a case will be explained below where the sequence length N is an odd number, a case is also possible where the sequence length N is an even number.

A cyclic shift ZC sequence or ZC-ZCZ (Zadoff-Chu Zero Correlation Zone) sequence, acquired by cyclically shifting the ZC sequence represented by equation 1 in the time domain, is represented by following equation 2.

(Equation 2)

$$f_{r,m}(n) = \exp\left\{\frac{-j2\pi r}{N}\left(\frac{(n \pm m\Delta)(n \pm m\Delta + 1)}{2}\right) + pn\right\}, \quad [2]$$
$$\text{when } N \text{ is odd}, \ n = 0, 1, \ldots, N-1$$

Here, m is the cyclic shift sequence number, and Δ is the cyclic shift interval. The "±" sign may be either plus or minus. Further, the sequence transformed into a frequency domain sequence by performing a Fourier transform of the time domain ZC sequence of equation 1, is also a ZC sequence, and, consequently, the frequency domain ZC sequence is represented by following equation 3.

(Equation 3)

$$F_u(k) = \exp\left\{\frac{-j2\pi u}{N}\left(\frac{k(k+1)}{2} + qk\right)\right\}, \quad [3]$$
$$\text{when } N \text{ is odd}, \ k = 0, 1, \ldots, N-1$$

Here, N is the sequence length, u is the ZC sequence number in the frequency domain, and N and u are coprime. Also, q is an arbitrary integer (generally q=0). Similarly, given that a cyclic shift and phase rotation form a Fourier transform pair, a frequency domain representation of the time domain ZC-ZCZ sequence of equation 2 is represented by following equation 4.

(Equation 4)

$$F_{u,m}(k) = \exp\left\{\frac{-j2\pi u}{N}\left(\frac{k(k+1)}{2} + qk\right) \pm \frac{j2\pi\Delta m}{N}k\right\}, \quad [4]$$
$$\text{when } N \text{ is odd}, \ k = 0, 1, \ldots, N-1$$

Here, N is the sequence length, u is the ZC sequence number in the frequency domain, and N and u are coprime. Also, m is the cyclic shift sequence number, Δ is the cyclic shift interval, and q is an arbitrary integer (generally, q=0).

With the ZC sequence represented by equation 4, two kinds of sequences of different sequence numbers (u) and sequences of different cyclic shift sequence numbers (m) can be used as reference signals (see FIG. 1). These sequences of different sequence numbers (u) semi-orthogonal to each other (i.e. these sequences have low correlation and are substantially orthogonal to each other), and the sequences of different cyclic shift sequence numbers (m) are orthogonal to each other in the period for a cyclic shift interval (Δ), providing good cross-correlation characteristics between sequences. Here, given the characteristics of CAZAC sequences, sequences of different cyclic shift values (mΔ) make it easy to provide orthogonality between cells between which frame synchronization is established.

Non-Patent Document 1 and Non-Patent Document 2 are directed to increasing reuse factors of sequences, and, as shown in FIG. 2, propose allocating different cyclic shift sequence numbers (in) of the same sequence number (u) between cells (e.g. cells that belong to the same base station) between which frame synchronization is established (Method 1). For example, cells between which inter-frame synchronization is established use ZC sequences of the same sequence number (u), cell #1 uses cyclic shift sequence numbers m=0 and 1, and cell #2 uses cyclic shift sequence numbers m=2 and 3. That is, if the cyclic shift interval Δ is 3, cell #1 uses sequences acquired by cyclically shifting a ZC sequence (m=0) through 0 and 3 samples, and cell #2 uses ZC sequences acquired by cyclically shifting the ZC sequence (m=0) through 6 and 9 samples.

The receiving side has detection ranges (i.e. detection windows) to match allocated cyclic shift sequence numbers, and, as shown in FIG. 3, can separate the reference signal of the subject cell from received signals by removing signals outside detection windows. For example, cell #1 separates a signal of that cell from the received signals by using only the detection windows of cyclic shift sequence numbers m=0 and 1. Further, as a precondition to perform this separation, each terminal needs to transmit a reference signal at the same time using the same transmission frequency band, and different cyclic shift sequence numbers (m) need to be set between reference signals.

Also, as shown in FIG. 4, in each cell, the cyclic shift sequence number in is allocated which is common between the numbers of RB's (Resource Blocks) (i.e. between frequency bandwidths). For example, regardless of the number of RB's, cyclic shift sequence numbers m=0 and 1 are allocated to cell #1, and cyclic shift sequence numbers m=2 and 3 are allocated to cell #2.

Although ZC sequences of different sequence numbers (u) are semi-orthogonal to each other as described above, it is known that there are combinations of sequence numbers between which the maximum value of cross-correlation is large, among ZC sequences of different sequence lengths (N). For example, sequences having close ratios of the ratio of sequence number (u) to sequence length (N) (i.e. u/N), have a high cross-correlation value. If ZC sequences having such a relationship are utilized in neighboring cells, there is a possibility that a large cross-correlation value (i.e. interference peak) appears in the detection range of the subject cell. With correlation results including the desired waves and interference waves included in the detection range, a base station cannot identify to which cell a terminal having transmitted a reference signal belongs, and therefore an error occurs in a channel estimation result. Non-Patent Document 3 and Non-Patent Document 4 are directed to alleviating interference from an adjacent cell, and propose a grouping method for allocating sequences of high cross-correlation to the same cell as shown in FIG. 5 (Method 2). By allocating these sequence numbers of high cross-correlation to the same cell as a group, it is possible to avoid the use of sequence numbers of high cross-correlation between neighboring cells.

Non-Patent Document 1: Motorola, R1-062610, "Uplink Reference Signal Multiplexing Structures for E-UTRA", 3GPP TSG RAN WG1 Meeting #46bis, Soul, Korea, Oct. 9-13, 2006

Non-Patent Document 2: Panasonic, R1-063183, "Narrow band uplink reference signal sequences and allocation for E-UTRA", 3GPP TSG RAN WG1 Meeting #47, Riga, Latcia, Nov. 6-10, 2006

Non-Patent Document 3: Huawei, R1-063356, "Sequence Assignment for Uplink Reference Signal", 3GPP TSG RAN WG1 Meeting #47, Riga. Latvia, Nov. 6-10, 2006

Non-Patent Document 4: LGE, R1-070911, "Binding method for UL RS sequence with different lengths", 3GPP TSG RAN WG1 Meeting #48, St. Louis, USA, Feb. 12-16, 2007

DISCLOSURE OF INVENTION

Problems to be Solved by the Invention

However, if the above method 1 and method 2 are adopted at the same time, interference is caused between sequences which have different bandwidths and which have high cross-correlation between cells between which synchronization is established, and therefore the accuracy of channel estimation may degrade. This reason will be described below.

Assume that different cyclic shift sequence numbers (m) of the same sequence number (u) are allocated to cells (e.g. cells that belong to the same base station) between which frame synchronization is established (method 1), and sequences numbers of high cross-correlation are allocated to ZC sequences of bandwidths in the same cell (method 2). In this case, if ZC sequences that are allocated to cells have the same sequence length and are allocated to the same frequency band, sequences are orthogonal to each other, and, consequently, the correlation value peak in interference waves (i.e. the timing at which the power value exceeds a predetermined value in a delay profile) are found in the detection window (i.e. detection window for interference waves) corresponding to the cyclic shift sequence number in set in advance.

However, the orthogonality is not established completely between sequences which have different bandwidths (i.e. different sequence lengths) and which have high cross-correlation, and, consequently, the width of a correlation value peak in interference waves may be spread or a position in which the correlation value peak is found may be shifted. As a result, interference wave peaks are detected in detection windows for desired waves, and correlation peaks in desired waves and correlation peaks in interference waves cannot be separated. Consequently, the influence of interference to desired waves increases between different cyclic shift sequences of those different sequences.

It is therefore an object of the present invention to provide a cyclic shift sequence generating method, radio communication terminal apparatus and radio communication base station apparatus whereby, even with cyclic shift sequences which have different bandwidths and which have high-cross correlation, it is possible to prevent interference waves from occurring in detection windows for desired waves and improve the accuracy of channel estimation in the base station.

Means for Solving the Problem

The cyclic shift sequence generating method of the present invention includes generating a cyclic shift sequence by making a cyclic shift interval $\Delta 1$ between cyclic shift sequences of a Zadoff-Chu sequence allocated to a single cell, different from a cyclic shift interval $\Delta 2$ between cyclic shift sequences allocated between different cells between which frame synchronization is established.

The radio communication terminal apparatus of the present invention employs a configuration having: a cyclic shift sum calculating section that calculates a sum of cyclic shifts that is equivalent to a sum of cyclic shift intervals between an allocated cyclic shift sequence and a reference cyclic shift sequence, based on a cyclic shift interval $\Delta 1$ between cyclic shift sequences of a Zadoff-Chu sequence allocated to a single cell and a cyclic shift interval $\Delta 2$, which is different from the cyclic shift interval $\Delta 1$, between cyclic shift sequences allocated between different cells between which frame synchronization is established; a reference signal generating section that generates, as a reference signal, the allocated cyclic shift sequence from the reference cyclic shift sequence, using the sum of cyclic shifts calculated; and a transmitting section that transmits the reference signal generated.

The radio communication base station apparatus of the present invention employs a configuration having: a dividing section that calculates a correlation value by dividing a reference signal included in a received signal using a Zadoff-Chu sequence; a cyclic shift sum determining section that determines a sum of cyclic shifts that is equivalent to a sum of cyclic shift intervals between an allocated cyclic shift sequence and a reference cyclic shift sequence, based on a cyclic shift interval $\Delta 1$ between cyclic shift sequences of a Zadoff-Chu sequence allocated to a single cell and a cyclic shift interval $\Delta 2$, which is different from the cyclic shift interval $\Delta 1$, between cyclic shift sequences allocated between different cells between which frame synchronization is established; and an extracting section that extracts a correlation value in a period including a correlation value of a desired sequence, based on the sum of cyclic shifts determined.

Advantageous Effect of the Invention

According to the present invention, even with cyclic shift sequences which have different bandwidths and which have high-cross correlation, it is possible to prevent interference waves from occurring in detection windows for desired waves and improve the accuracy of channel estimation in a base station.

BEST MODE FOR CARRYING OUT THE INVENTION

Figure 1:
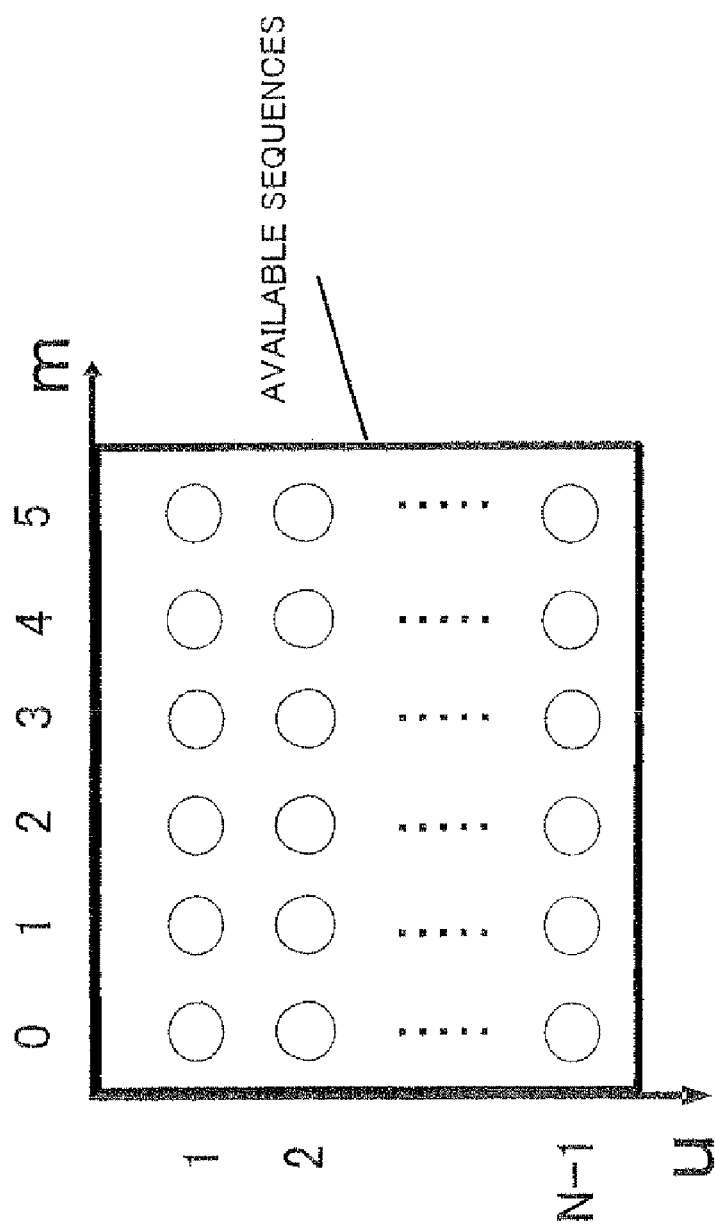
FIG. 1 illustrates ZC sequences that can be used as reference signals.
Figure 2:
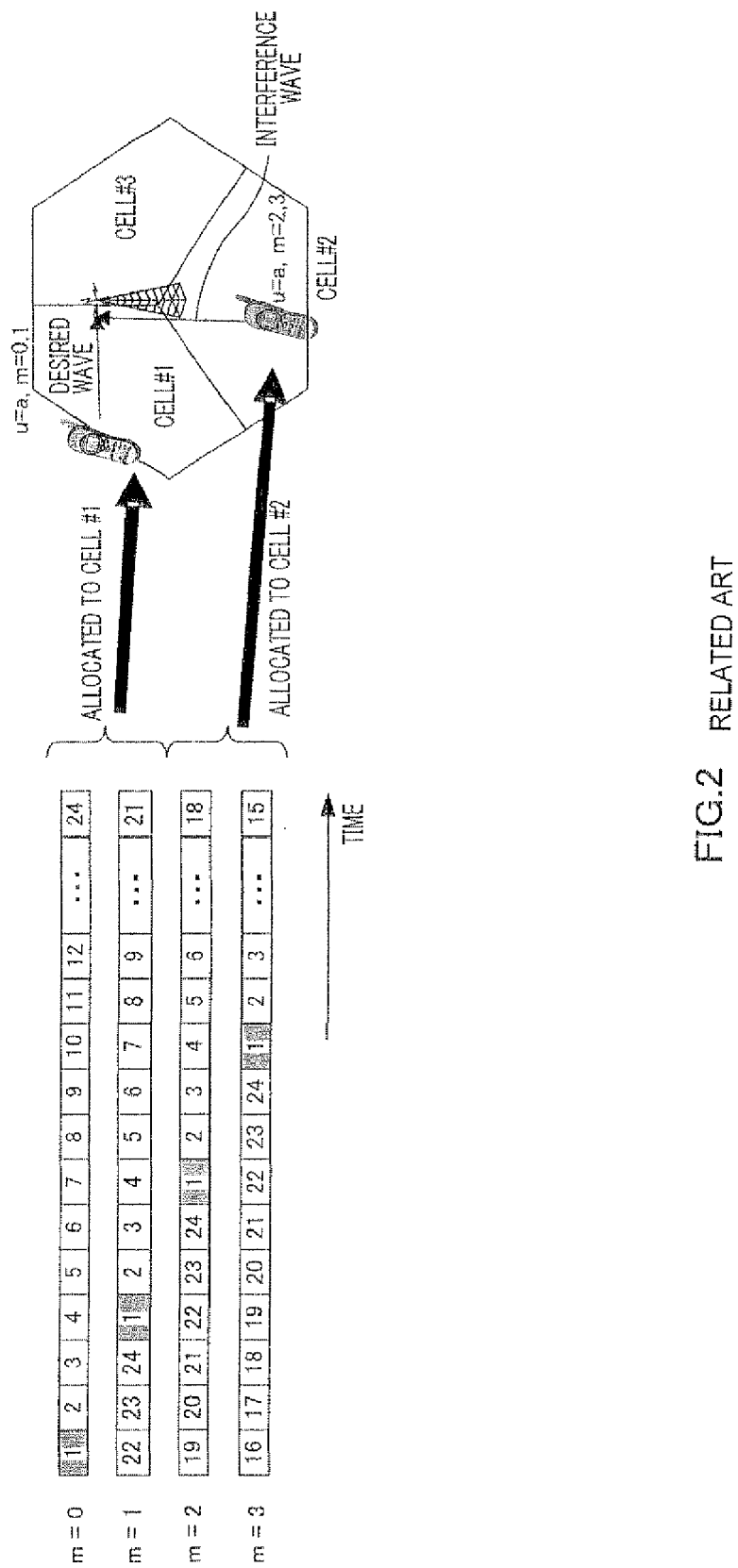
FIG. 2 illustrates a state where different cyclic shift sequences of the same sequence number are allocated between cells between which frame synchronization is established.
Figure 3:
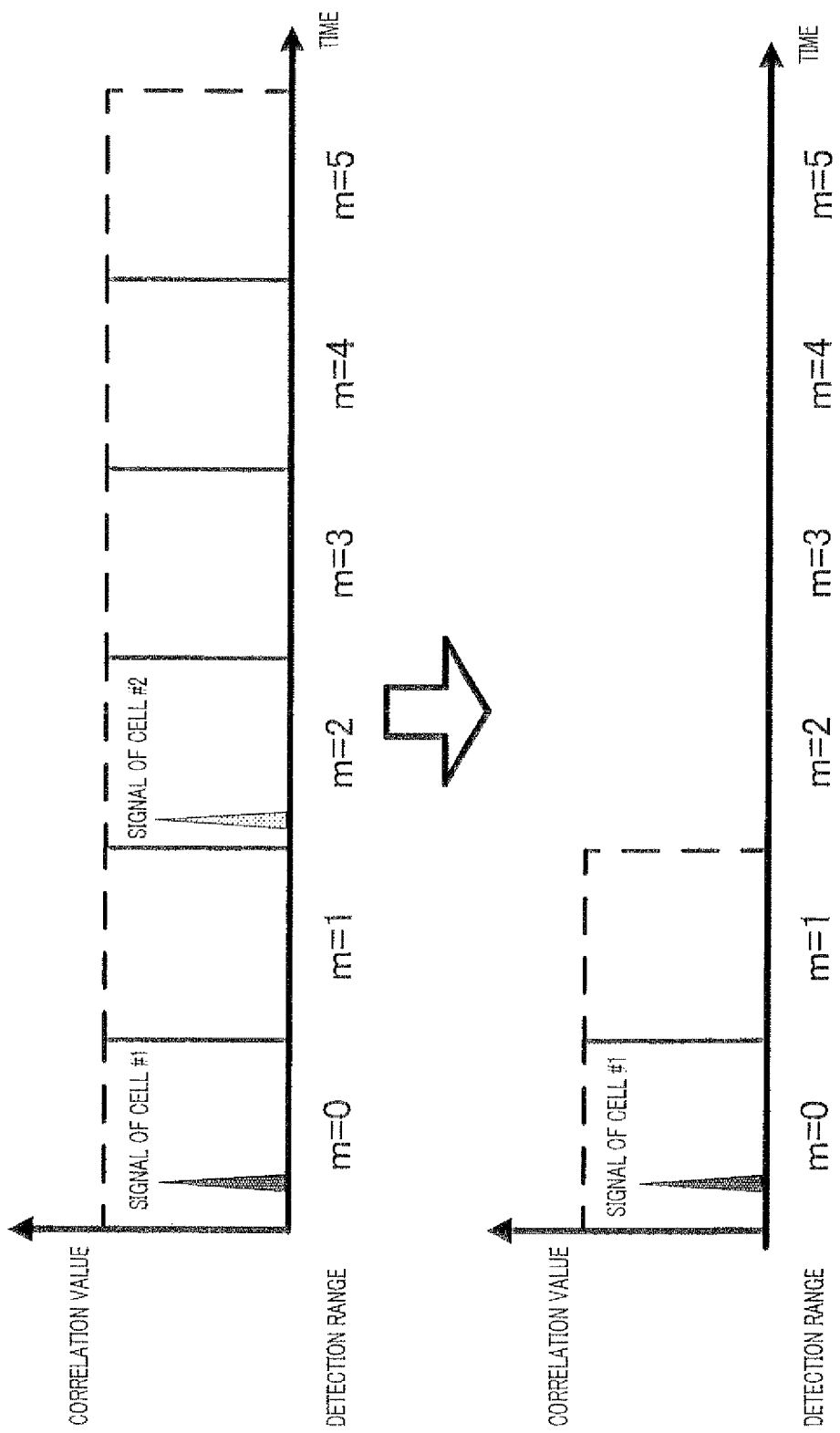
FIG. 3 illustrates the detection ranges corresponding to cyclic shift sequence numbers and illustrates a state where a signal of a subject cell is separated from received signals.
Figure 4:
FIG. 4 illustrates a state where common cyclic shift sequence numbers are allocated in each RB.
Figure 5:
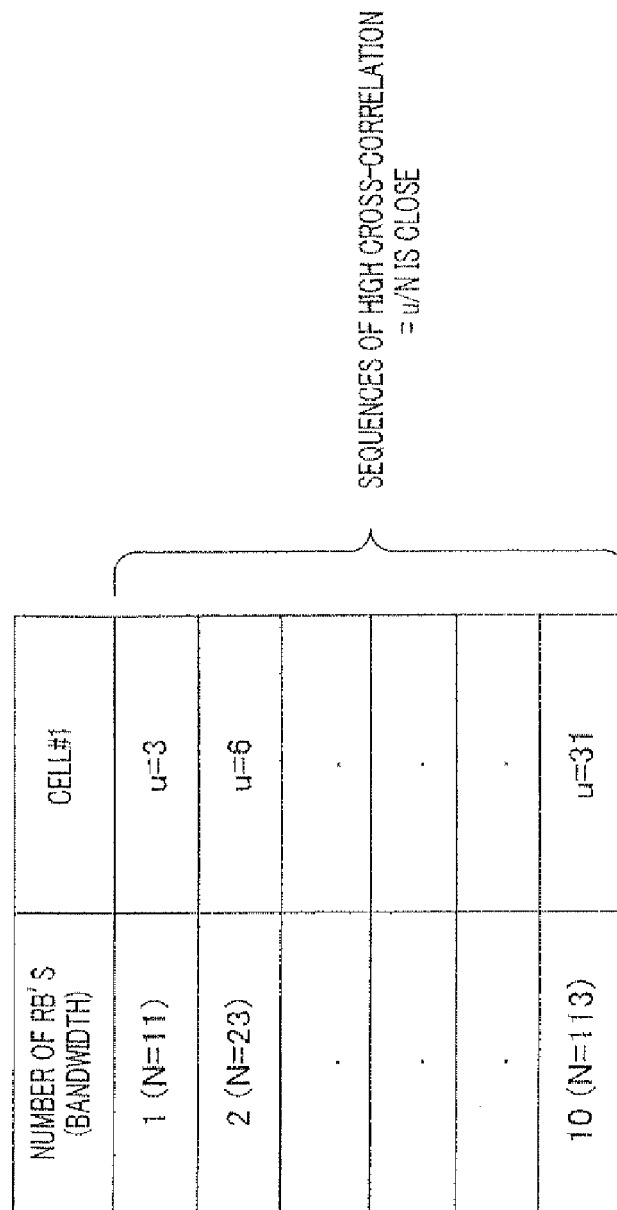
FIG. 5 illustrates the method of grouping sequences disclosed in Non-Patent Document 3 and Non-Patent Document 4.
Figure 6:
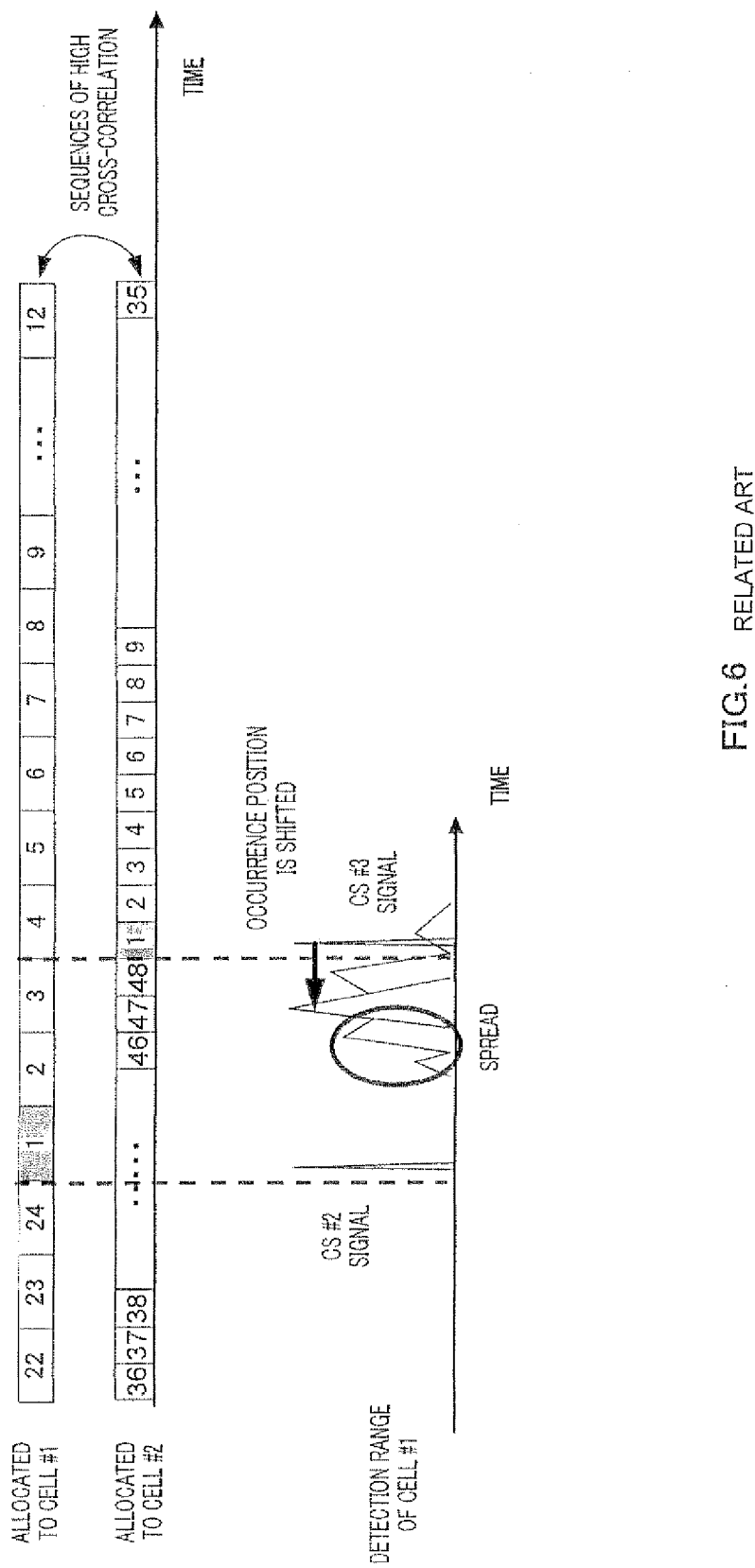
FIG. 6 illustrates a state where an interference peak occurs in the detection window for a cyclic shift sequence allocated to a subject cell.

Embodiments of the present invention will be explained below in detail with reference to the accompanying drawings.

Here, in the embodiments, the same components having the same functions will be allocated the same reference numerals and overlapping explanation will be omitted.

(Embodiment 1)

The configuration of terminal 100 according to Embodiment 1 of the present invention will be explained using FIG. 7. Radio frequency (RF) receiving section 102 performs receiving processing such as down-conversion and A/D conversion on a signal received via antenna 101, and outputs the signal subjected to receiving processing to demodulating section 103. Demodulating section 103 performs equalization processing and demodulation processing on the signal outputted from RF receiving section 102, and outputs the signal subjected to these processing to decoding section 104. Decoding section 104 performs decoding processing on the signal outputted from demodulating section 103, and extracts a data signal and control information. Further, in the extracted control information, the cyclic shift sequence numbers are outputted to cyclic shift sum calculating section 105, and the RB allocation information is outputted to mapping section 109.

Cyclic shift sum calculating section 105 calculates the sum of cyclic shifts based on the cyclic shift sequence number outputted from decoding section 104 and cyclic shift intervals allocated to cells between which frame synchronization is established (i.e. between cells) and to a single cell (i.e. in a cell), and outputs the sum of cyclic shifts calculated to cyclic shift section 107 in reference signal generating section 106.

Figure 8:
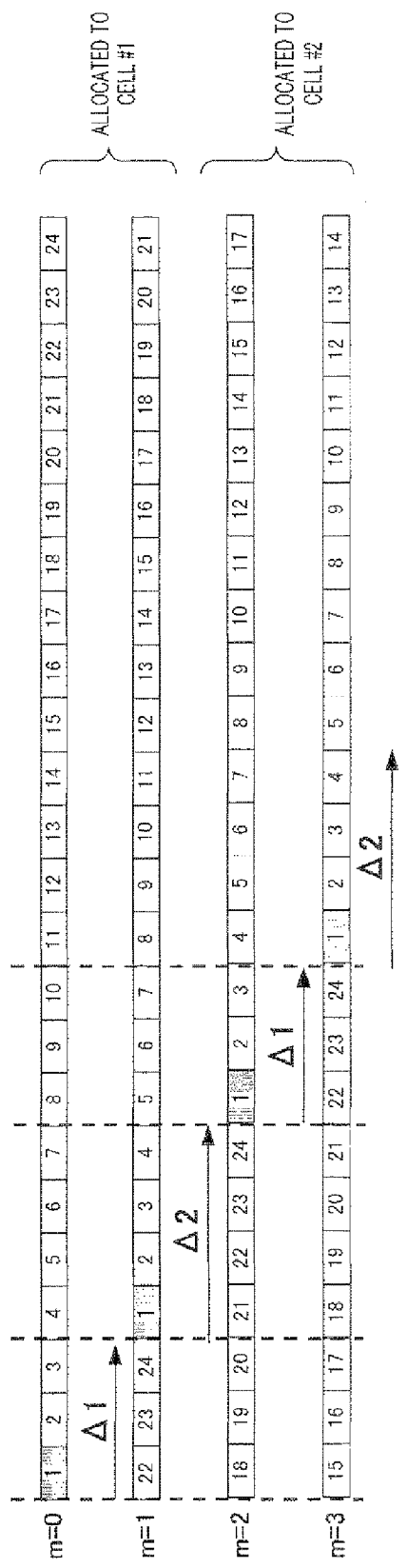
FIG. 8 illustrates a relationship between cyclic shift interval $\Delta 1$, which is the interval between cyclic shift sequences allocated in a cell, and cyclic shift interval $\Delta 2$, which is the interval between cyclic shift sequences allocated between cells.

Here, the cyclic shift sequence numbers that are allocated in a cell or between cells are determined in advance. For example, as shown in FIG. 8, assume that cyclic shift sequence numbers m=0 and 1 are allocated to cell #1, and cyclic shift sequence numbers m=2 and 3 are allocated to cell #2. Further, assume that the cyclic shift interval is $\Delta 1$ between cyclic shift sequences allocated in a cell, and the cyclic shift interval is $\Delta 2$ ($\neq \Delta 1$) between cyclic shift sequences allocated between cells. In the example shown in FIG. 8, the cyclic shift interval $\Delta 1$ is three samples between the cyclic shift sequences (m=0 and 1) allocated to cell #1 and between the cyclic shift sequences (m—2 and 3) allocated to cell #2, and the cyclic shift interval $\Delta 2$ is four samples between the cyclic shift sequences (m=1 and 2) allocated between cell #1 and cell #2. In this case, if a base station reports m=2 to terminal 100, cyclic shift sum calculating section 105 of terminal 100 calculates $\Delta 1+\Delta 2=7$ samples as the sum of cyclic shifts, which is equivalent to the sum of cyclic shift intervals from the reference cyclic shift sequence of m=0.

Also, although a ease has been described above where the cyclic shift sequence numbers allocated to cells are determined in advance, the essential requirement is to employ a method whereby the relationships between the cyclic shift sequence numbers allocated in a cell and the cyclic shift sequence numbers allocated between cells, are held between a base station and a terminal. For example, a base station may report to a terminal the relationships between the cyclic shift sequence numbers allocated in a cell and the cyclic shift sequence numbers allocated between cells.

Also, although an example case has been described above where the cyclic shift sequence number m is reported, the absolute value of cyclic shift interval from a ZC sequence that is not cyclically shifted, may be reported on a per terminal basis (i.e. a base station reports ($\Delta 1+\Delta 2$) to terminal 100). In this case, a cyclic shift sum calculating section is unnecessary, and the configuration is employed for inputting the reported absolute value of the cyclic shift interval (e.g. $\Delta 1+\Delta 2$) in cyclic shift section 107.

Reference signal generating section 106 is provided with cyclic shift section 107, discrete Fourier transform (DFT) section 108, mapping section 109 and inverse discrete Fourier transform (IDFT) section 110, and generates a reference signal from a ZC sequence based on the sum of cyclic shifts outputted from cyclic shift sum calculating section 105, and outputs the generated reference signal to multiplexing section 114. The configuration inside reference signal generating section 106 will be explained below.

Cyclic shift section 107 cyclically shifts a ZC sequence outputted from a ZC sequence generating section that generates ZC sequences, by the sum of cyclic shifts outputted from cyclic shift sum calculating section 105, and outputs the ZC sequence cyclically shifted to DFT section 108.

Here, the ZC sequence generating section specifies the transmission bandwidth of a ZC sequence using RB allocation information in the control information extracted in decoding section 104, and specifies the ZC sequence length corresponding to the specified transmission bandwidth. Further, the ZC sequence generating section specifies a sequence number using information indicating sequence numbers allocated to a belonging cell, in the control information extracted in decoding section 104. The ZC sequence generating section then generates a ZC sequence using these sequence length and sequence number, and outputs the ZC sequence to cyclic shift section 107.

DFT section 108 performs DFT (Discrete Fourier Transform) processing on the ZC sequence outputted from cyclic shift section 107 to transform the time domain signal into a frequency domain signal, and outputs the ZC sequence transformed into a frequency domain sequence to mapping section 109.

Mapping section 109 maps the ZC sequence outputted from DFT section 108 on the band corresponding to the transmission band of terminal 100, based on the RB allocation information outputted from decoding section 104, and outputs the mapped ZC sequence to IDFT section 110. IDFT (Inverse Discrete Fourier Transform) section 110 performs IDFT processing on the ZC sequence outputted from mapping section 109 and outputs the ZC sequence subjected to IDFT processing to multiplexing section 114.

Encoding section 111 encodes transmission data and outputs the encoded data to modulating section 112. Modulating section 112 modulates the encoded data outputted from encoding section 111 and outputs the modulated signal to RB allocating section 113. RB allocating section 113 allocates the modulated signal outputted from modulating section 112 to an RB and outputs the modulated signal allocated to the RB to multiplexing section 114.

Multiplexing section 114 time-multiplexes the transmission data outputted from RB allocating section 113 and the ZC sequence (reference signal) outputted from IDFT section 110, and outputs the multiplexed signal to RF transmitting section 115. Here, the multiplexing method in multiplexing section 114 is not limited to time multiplexing, and it is equally possible to adopt frequency multiplexing, code multiplexing or IQ multiplexing in a complex space.

RF transmitting section 115 performs transmission processing such as D/A conversion, up-conversion and amplification on the multiplexed signal outputted from multiplexing section 114, and transmits by radio the signal subjected to transmission processing from antenna 101.

Figure 9:
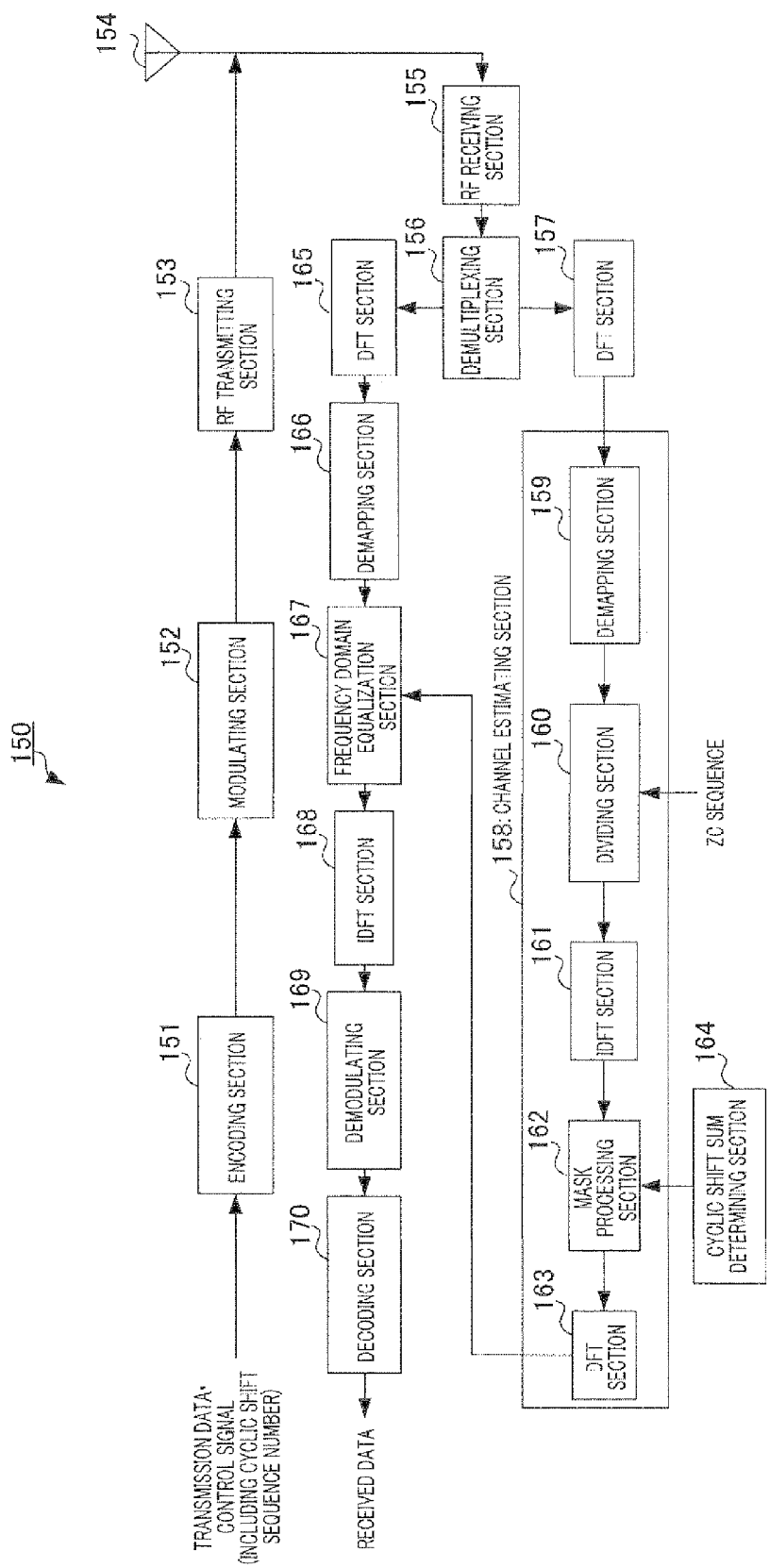
FIG. 9 is a block diagram showing the configuration of a base station according to Embodiment 1 of the present invention.

Next, the configuration of base station 150 according to Embodiment 1 of the present invention will be explained using FIG. 9. Encoding section 151 encodes transmission data and control signal, and outputs the encoded data to modulating section 152. Here, the control signal includes a cyclic shift sequence number that is allocated to a cell. Modulating section 152 modulates the encoded data and outputs the modulated signal to RF transmitting section 153. RE transmitting section 153 performs transmission processing such as D/A conversion, up-conversion and amplification on the modulated signal, and transmits by radio the signal subjected to transmission processing from antenna 154.

RF receiving section 155 performs receiving processing such as down-conversion and A/D conversion on a signal received via antenna 154, and outputs the signal subjected to receiving processing to demultiplexing section 156. Demultiplexing section 156 demultiplexes the signal outputted from RF receiving section 155 into the reference signal, data signal and control signal, outputs the reference signal to DFT (Discrete Fourier Transform) section 157 and outputs the data signal and the control signal to DFT section 165.

DFT section 157 performs DFT processing on the reference signal outputted from demultiplexing section 156 to transform a time domain signal into a frequency domain signal, and outputs the reference signal transformed into a frequency domain signal to demapping section 159 of channel estimating section 158.

Channel estimating section 158 is provided with demapping section 159, dividing section 160, IDFT (Inverse Discrete Fourier Transform) section 161, mask processing section 162 and DFT section 163, and estimates a channel based on the reference signal outputted from DFT section 157. The configuration inside channel estimating section 158 will be explained below in detail.

Demapping section 159 extracts parts corresponding to the transmission bands of terminals, from the signal outputted from DFT section 157, and outputs the extracted signals to dividing section 160. Dividing section 160 divides the signal outputted from demapping section 159 by the above reference ZC sequence (i.e. the ZC sequence of cyclic shift sequence number m=0), and outputs the division result (i.e. correlation value) to IDFT section 161. IDFT section 161 performs IDFT processing on the signal outputted from dividing section 160, and outputs the signal subjected to IDFT processing to mask processing section 162.

By performing mask processing on the signal outputted from IDFT section 161 based on a sum of cyclic shifts outputted from cyclic shift sum determining section 164, which will be described later, mask processing section 162 as an extracting section extracts the correlation value in the period (i.e. detection window) in which there is the correlation value of the desired cyclic shift sequence, and outputs the extracted value to DFT section 163.

DFT section 163 performs DFT processing on the correlation value outputted from mask processing section 162, and outputs the correlation value subjected to DFT processing to frequency domain equalization section 167. Here, the signal outputted from DFT section 163 represents the frequency variation in the channel.

In cyclic shift sum determining section 164, the same content as set in cyclic shift sum calculating section 105 of terminal 100 is set in advance. That is, as in the example shown in FIG. 8, the cyclic shift sequence numbers m=0 and 1 are allocated to cell #1, and the cyclic shift sequence numbers m=2 and 3 are allocated to cell #2. Also, the cyclic shift interval $\Delta 1$ is three samples between the cyclic shift sequences (m=0 and 1) allocated to cell #1 and between the cyclic shift sequences (m=2 and 3) allocated to cell #2, and the cyclic shift interval $\Delta 2$ is four samples between the cyclic shift sequences (m=1 and 2) allocated between cell #1 and cell #2.

Here, if base station 150 reports to terminal 100 that terminal 100 transmits the ZC sequence of m=2, base station 150 knows that the ZC sequence of the sum of cyclic shifts of 7 samples is transmitted from terminal 100, and, consequently, mask processing section 162 performs extraction only in the period (detection window) corresponding to the above ZC sequence. Also, the detection window width may be common between a plurality of cyclic shift intervals. That is, the detection window width needs not be changed based on the cyclic shift interval between cells or in a cell. Here, the detection window width may be changed based on the cyclic shift interval between cells or in a cell.

DFT section 165 performs DFT processing on the data signal and control signal outputted from demultiplexing section 156 to transform the time domain signals into frequency domain signals, and outputs the data signal and control signal transformed into a frequency domain signal to demapping section 166.

Demapping section 166 extracts parts of the data signal and control signal corresponding to the transmission bands of terminals, and outputs the extracted signals to frequency domain equalization section 167.

Frequency domain equalization section 167 performs equalization processing on the data signal and control signal outputted from demapping section 166, using the signal (i.e. the frequency response of the channel) outputted from DFT section 163 in channel estimating section 158, and outputs the signals subjected to equalization processing to IDFT section 168.

IDFT section 168 performs IDFT processing on the data signal and control signal outputted from frequency domain equalization section 167, and outputs the signals subjected to IDFT processing to demodulating section 169. Demodulating section 169 performs demodulation processing on the signals subjected to IDFT processing, and outputs the signals subjected to demodulation processing to decoding section 170. Decoding section 170 performs decoding processing on the signals subjected to demodulation processing, and extracts received data.

Figure 10:
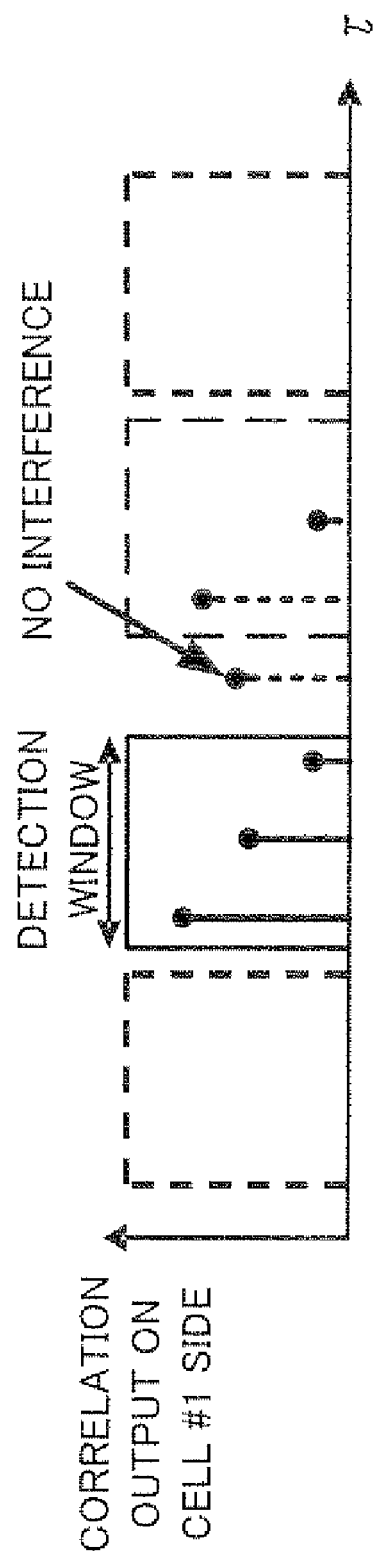
FIG. 10 illustrates a state where a correlation value is extracted in a mask processing section shown in FIG. 9.

Next, the above extraction of a correlation value in mask processing section 162 of base station 150 will be explained using FIG. 10. In FIG. 10, the correlation values represented by the solid lines show the correlation values of desired waves, and the correlation values represented by the dotted lines show the correlation values of interference waves. Also, the detection window represented by the solid lines show the detection window for the desired waves. Here, the signal of cell #1 is the desired wave. As shown in this figure, it is acknowledged that the correlation values of interference waves are found outside the range of the detection window (i.e. outside the detection window) for the desired waves. This is because a position in which correlation of interference waves is caused, changes based on changes of a cyclic shift interval. By this means, it is possible to alleviate interference between adjacent cells and improve the accuracy of channel estimation.

As described above, according to Embodiment 1, by determining in advance cyclic shift sequence numbers allocated to cells and holding the relationship of $\Delta 1 < \Delta 2$ where $\Delta 1$ is the cyclic shift interval between cyclic shift sequences allocated in a cell and $\Delta 2$ is the cyclic shift interval between cyclic shift sequences allocated between cells, it is possible to find correlation values of interference waves outside the range of the detection window for the desired waves and alleviate interference between adjacent cells, thereby improving the accuracy of channel estimation.

Also, the processing method in base station 150 is not limited to the above, and the essential requirement is that the method can separate the desired waves from interference waves. For example, based on the sum of cyclic shifts outputted from cyclic shift sum determining section 164, a ZC sequence acquired by cyclically shifting the reference ZC sequence of m=0 is outputted to dividing section 160. Dividing section 160 divides a signal outputted from demapping section 159 by a ZC sequence, which is acquired by cyclically shifting a ZC sequence through the sum of cyclic shifts received as input (i.e. the same sequence as a cyclic shift ZC sequence transmitted on the transmitting side), and outputs the division result (i.e. correlation value) to IDFT section 161. By performing mask processing on signals outputted from IDFT section 161, mask processing section 162 extracts the correlation value in the period in which there is the correlation value of the desired cyclic shift sequence (i.e. the first detection window if division processing is performed using a ZC sequence acquired by performing a cyclic shift by the sum of cyclic shifts), and outputs the extracted correlation value to DFT section 163. By these processing, it is possible to separate the desired waves and the interference waves from received waves.

Figure 7:
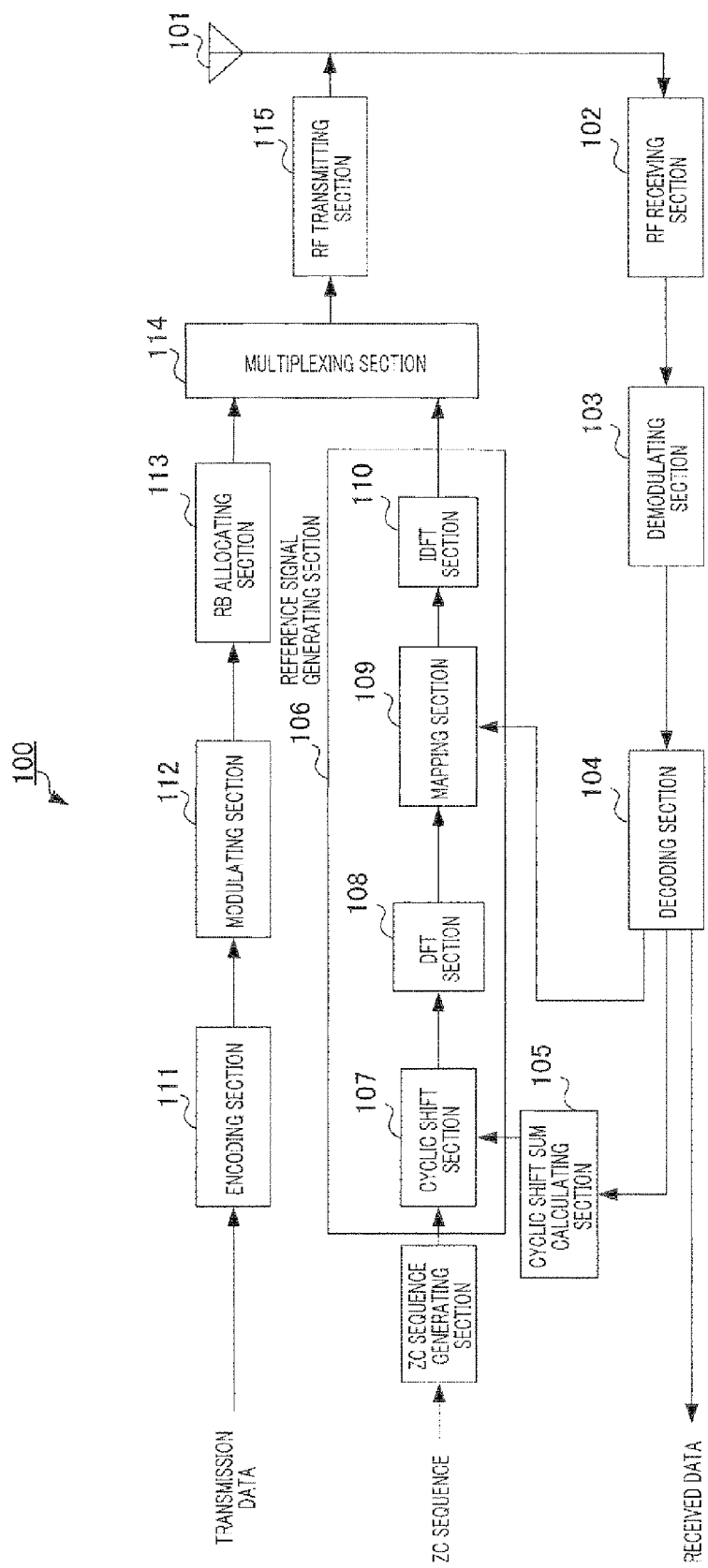
FIG. 7 is a block diagram showing the configuration of a terminal according to Embodiment 1 of the present invention.
Figure 11A:
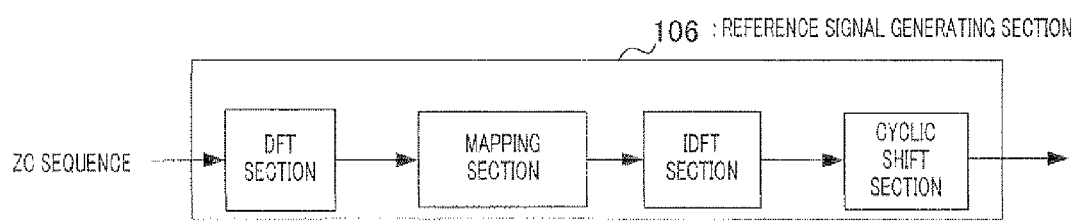
FIG. 11A is a block diagram showing another configuration inside a reference signal generating section shown in FIG. 7 (example 1)
Figure 11B:
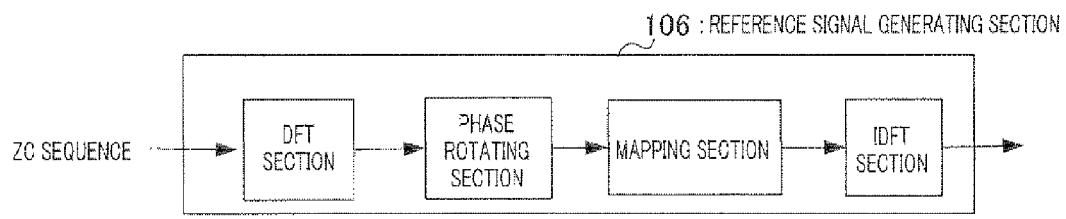
FIG. 11B is a block diagram showing another configuration inside a reference signal generating section shown in FIG. 7 (example 2)

Also, although a case has been described with the present embodiment where reference signal generating section 106 in terminal 100 is as shown in FIG. 7, it is equally possible to employ the configurations shown in FIG. 11A and FIG. 11B. In reference signal generating section 106 shown in FIG. 11A, a cyclic shift section is provided after an IDFT section. This cyclic shift section needs to perform a cyclic shift using the sum of cyclic shifts talking into account oversampling.

Also, in reference signal generating section 106 shown in FIG. 11B, a phase rotating section is provided after a DFT section. Instead of performing a cyclic shift in the time domain, this phase rotating section performs processing, which is equivalent to a cyclic shift in the time domain, in the frequency domain. That is, the amount of phase rotation corresponding to the sum of cyclic shifts is allocated to each subcarrier. Here, it is known from the relationship of the Fourier transform pair in equation 5 that a cyclic shift in the time domain is equivalent to a phase rotation in the frequency domain. [5]

$$X(n)\exp(-j2\pi n\Delta/N) = \text{DFT}[x(k-\Delta)], \text{DFT}[\ ]: \text{Discrete Fourier Transform}$$
$$x(k-\Delta) = \text{IDFT}\{X(n)\exp(-j2\pi n\Delta/N)\}\ \text{IDFT}[\ ]: \text{Inverse Discrete Fourier Transform}$$
(Equation 5)

Although reference signal generating section 106 shown in FIG. 11A and FIG. 11B generate a ZC sequence in the time domain (equation 2), reference signal generating section 106 may generate a ZC sequence in the frequency domain, provided that a Fourier transform pair of a ZC sequence is mapped by ZC sequences of the same sequence length. That is, instead of generating a ZC sequence and performing DFT processing, it is possible to directly generate a ZC sequence in the frequency domain without using a DFT section (equation 4).

Also, although a case has been described with the present embodiment where the cyclic shift interval $\Delta 2$ between cells is greater than the cyclic shift interval $\Delta 1$ in a cell ($\Delta 1 < \Delta 2$), the present invention is not limited to this, and it is equally possible to make $\Delta 2$ smaller than $\Delta 1$ ($\Delta 1 > \Delta 2$) if, for example, it is known in advance that sequences of high cross-correlation are not used between different cells. Also, it is possible to combine $\Delta 1 < \Delta 2$ and $\Delta 1 > \Delta 2$, or use only one of $\Delta 1 < \Delta 2$ and $\Delta 1 > \Delta 2$. Further, it is equally possible to use a combination of the cases of $\Delta 1 < \Delta 2$ and $\Delta 1 = \Delta 2$, or a combination of $\Delta 1 > \Delta 2$ and $\Delta 1 = \Delta 2$. For example, there may be a base station that performs an allocation with $\Delta 1<\Delta 2$ and a base station that performs an allocation with $\Delta 1=\Delta 2$.

(Embodiment 2)

A case will be explained with Embodiment 2 of the present invention where, based on interference from an adjacent cell, the cyclic shift interval $\Delta 1$ between cyclic shift sequences of a Zadoff-Chu sequence allocated in the same cell, and the cyclic shift interval $\Delta 2$ between cyclic shift sequences allocated between different cells between which frame synchronization is established, are controlled. Here, assume that one from a plurality of sequence groups is allocated to each base station, and each sequence group has the sequence numbers of ZC sequences allocated as the ZC sequences of transmission bandwidths.

The configuration of the terminal according to Embodiment 2 of the present invention will be explained. Here, cyclic shift sum calculating section 105 will be explained using FIG. 7 because the configuration of a terminal according to the present embodiment is similar to the configuration shown in FIG. 7 of Embodiment 1, and differs from the configuration shown in FIG. 7 only in receiving control information including cyclic shift sequence numbers and sequence group numbers from a base station, in the terminal, and in part of the functions of cyclic shift sum calculating section 105.

Cyclic shift sum calculating section 105 calculates the sum of cyclic shifts using a cyclic shift sequence number and sequence group number outputted from decoding section 104. To be more specific, cyclic shift sum calculating section 105 estimates a sequence group allocated to the subject base station based on the sequence group number, and decides whether the estimated sequence group is formed with a combination of sequences of high cross-correlation or the estimated sequence group is formed with a combination of sequences of low cross-correlation. Next, cyclic shift sum calculating section 105 determines the sum of cyclic shifts using the cyclic shift sequence number outputted from decoding section 104 and the relationship between the cyclic shift interval $\Delta 1$ and the cyclic shift interval $\Delta 2$ derived from the above decision result (which will be described later), where the cyclic shift interval $\Delta 1$ is the interval between sequences in a cell and the cyclic shift interval $\Delta 2$ is the interval between sequences between cells.

As a method of deciding whether cross-correlation is high or cross-correlation is low, when two ZC sequences have the sequence numbers (u1, u2) and the sequence lengths (N1, N2), the cross-correlation is decided high if the difference between the ratios (u1/N1) and (u2/N2) is equal to or less than a predetermined threshold, and the cross-correlation is decided low if the difference between the ratios is greater than a predetermined threshold.

Next, the relationship between the cyclic shift interval $\Delta 1$ and the cyclic shift interval $\Delta 2$ based on the decision result of the cross-correlation, will be explained, where the cyclic shift interval $\Delta 1$ is the interval between sequences in a cell and the cyclic shift interval. $\Delta 2$ is the interval between sequences between cells. In the sequence group of high cross-correlation, as shown in FIG. 8, the cyclic shift interval $\Delta 1$ between cyclic shift sequences allocated in a cell and the cyclic shift interval $\Delta 2$ between cyclic shift sequences allocated between cells, hold in advance the relationship that the cyclic shift interval between cells is greater than the cyclic shift interval in a cell ($\Delta 1<\Delta 2$). Also, the sequence group of low cross-correlation holds the relationship that the cyclic shift interval in a cell is equal to or greater than the cyclic shift interval between cells ($\Delta 1 \geqq \Delta 2$).

In this case, the sequence group of high cross-correlation provides significant interference between adjacent cells, and, by making this sequence group hold the relationship that the cyclic shift interval between cells is greater than the cyclic shift interval in a cell ($\Delta 1<\Delta 2$), it is possible to reduce interference between adjacent cells. By contrast, the sequence group of low cross-correlation provides insignificant interference between adjacent cells, and, by making this sequence group hold the relationship that the cyclic shift interval between cells is smaller than the cyclic shift interval in a cell ($\Delta 1 \geqq \Delta 2$), it is possible to shorten the cyclic shift interval in each cyclic shift sequence and therefore increase the number of cyclic shift sequences.

Also, sequence group information may be information that allows indirect estimation of sequence groups. For example, one sequence group is allocated to each cell, and, consequently, it may be possible to estimate sequence group information from a cell 1D.

Next, the configuration of a base station according to Embodiment 2 of the present invention will be explained. Here, cyclic shift sum determining section 164 will be explained using FIG. 9 because the configuration of a base station according to the present embodiment is similar to the configuration shown in FIG. 9 of Embodiment 1, and differs from the configuration shown in FIG. 9 only in part of the functions of cyclic shift sum determining section 164.

In cyclic shift sum determining section 164, the same content as set in cyclic shift sum calculating section 105 of a terminal is set in advance. That is, a sequence group of high cross-correlation holds the relationship of $\Delta 1<\Delta 2$, and a sequence group of low cross-correlation holds the relationship of $\Delta 1 \geqq \Delta 2$. For example, the cyclic shift sequence numbers m=0 and 1 are set to be allocated to cell #1, and the cyclic shift sequence numbers m=2 and 3 are set to be allocated to cell #2. Further, a sequence group of high cross-correlation holds the relationship of $\Delta 1=3$ and $\Delta 2=4$, and a sequence group of low cross-correlation holds the relationship of $\Delta 1=3$ and $\Delta 2=3$.

In this case, if a base station reports terminal 100 that terminal 100 transmits the ZC sequence of m=2, the base station to which a sequence group of high cross-correlation is allocated, knows that the ZC sequence of the sum of cyclic shifts of 7 samples is transmitted from terminal 100, while the base station to which a sequence group of low cross-correlation is allocated, knows that the ZC sequence of the sum of cyclic shifts of 6 samples is transmitted from terminal 100. Mask processing section 162 performs extraction only in the period (detection window) corresponding to the samples of the sum of cyclic shifts.

Thus, according to Embodiment 2, a sequence group of high cross-correlation provides significant interference between cells, and, by making this sequence group hold the relationship of $\Delta 1<\Delta 2$, it is possible to reduce interference between adjacent cells. Also, a sequence group of low cross-correlation provides insignificant interference between cells, and, by making this sequence group hold the relationship of $\Delta 1 \geqq \Delta 2$, it is possible to shorten the cyclic shift interval in each cyclic shift sequence and therefore increase the number of cyclic shift sequences.

Also, although a case has been described above with Embodiment 2 where sequence groups are allocated to a base station, the present invention is not limited to this, and is also applicable to cases where a sequence group of low cross-correlation is allocated to a ZC sequence of a long sequence length and a sequence group of high cross-correlation is allocated to a ZC sequence of a short sequence length. For example, a group of low cross-correlation is allocated to a ZC sequence of a long sequence length (e.g. a ZC sequence having a transmission bandwidth equal to or greater than 10

RB's), and a group of high cross-correlation is allocated to a ZC sequence of a short sequence length (e.g. a ZC sequence having a transmission bandwidth less than 10 RB's). In this case, the sequence group of high cross-correlation holds the relationship that the cyclic shift interval between cells is greater than the cyclic shift interval in a cell ($\Delta 1 < \Delta 2$), and the sequence group of low cross-correlation holds the relationship that the cyclic shift interval between cells is equal to or less than the cyclic shift interval in a cell $\Delta 1 \geqq \Delta 2$. Also, although the above decision is made based on the cross-correlation in sequence groups, if the cross-correlation between adjacent cells can be decided instead of the cross-correlation in sequence groups, other methods are possible.

Also, a case has been described above with the present embodiment where the cyclic shift intervals $\Delta 1$ and $\Delta 2$ are controlled based on the cross-correlation in sequence groups allocated to cells between which synchronization is established. However, the present invention is not limited to this, and, for example, a base station may measure interference power from adjacent cells to the desired waves (i.e. ZC sequence) and control the cyclic shift intervals $\Delta 1$ and $\Delta 2$. The configurations of a terminal and base station in this case will be explained below.

Cyclic shift sum calculating section 105 will be explained using FIG. 7 because the configuration of another terminal according to Embodiment 2 of the present invention is similar to the configuration shown in FIG. 7 of Embodiment 1, and differs from the configuration shown in FIG. 7 only in receiving control information including cyclic shift sequence numbers and interference power information showing interference power between adjacent cells from a base station, in the terminal, and in part of the functions of cyclic shift sum calculating section 105.

Cyclic shift sum calculating section 105 calculates the sum of cyclic shifts using a cyclic shift sequence number and interference power information outputted from decoding section 104. Here, in cyclic shift sum calculating section 105, high interference power holds the relationship that the cyclic shift interval between cells is greater than the cyclic shift interval in a cell ($\Delta 1 < \Delta 2$), and low interference power holds the relationship that the cyclic shift interval between cells is equal to or less than the cyclic shift interval in a cell ($\Delta 1 \geqq \Delta 2$). Further, cyclic shift sum calculating section 105 calculates the sum of cyclic shifts from a cyclic shift sequence number and the values of $\Delta 1$ and $\Delta 2$ that are decided based on the magnitude of interference power.

Figure 12:
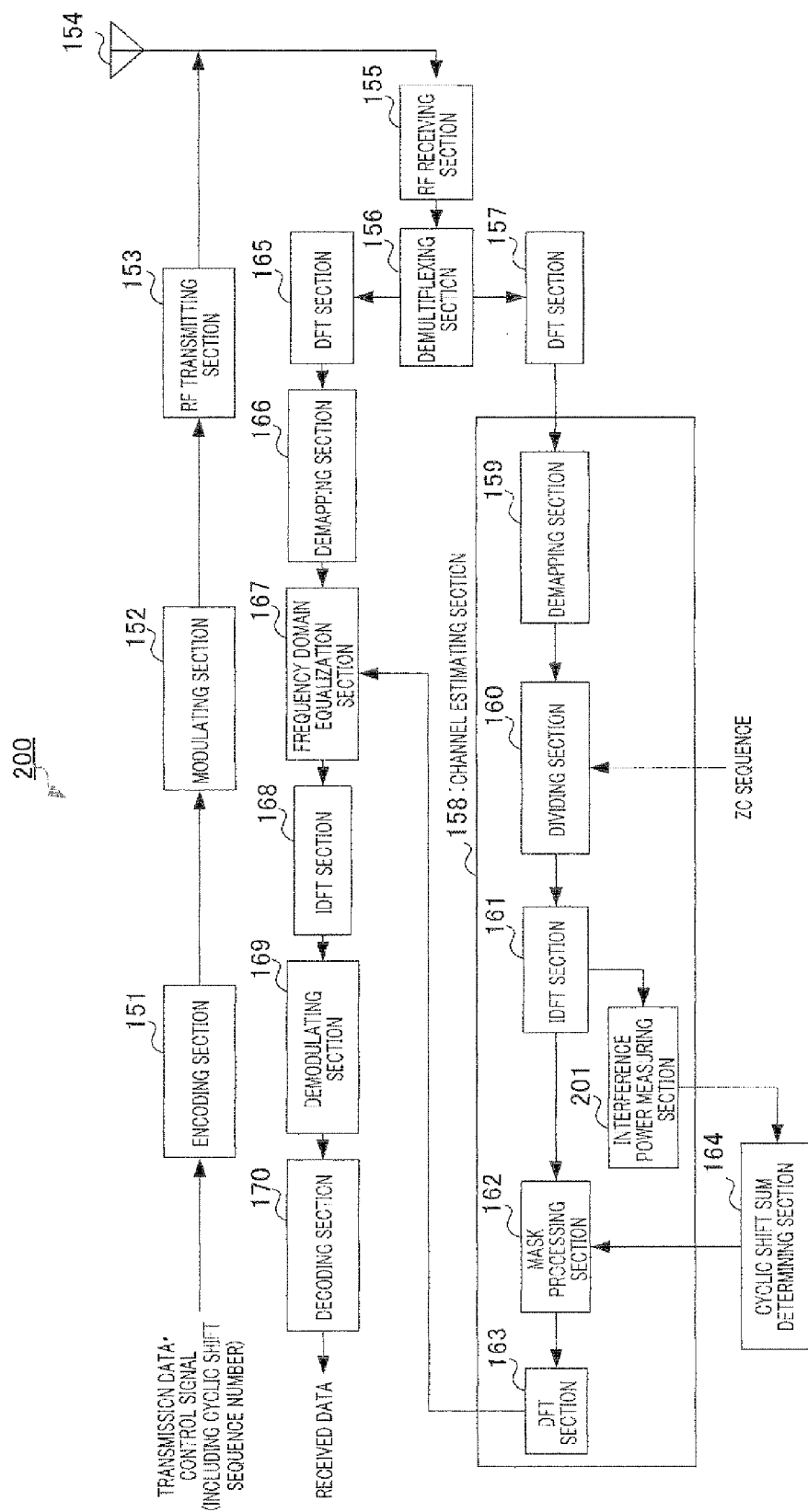
FIG. 12 is a block diagram showing another configuration of a base station according to Embodiment 2 of the present invention.

Next, the configuration of another base station according to Embodiment 2 of the present invention will be explained using FIG. 12. Here, base station 200 of FIG. 12 differs from FIG. 9 in adding interference power measuring section 201.

Interference power measuring section 201 measures interference power using signals outputted from IDFT section 161. For example, interference power measuring section 201 measures interference power by measuring the power of signals outside the period (i.e. detection window) corresponding to the ZC sequence for the subject mobile station, among signals outputted from IDFT section 161. The measured interference power is outputted to cyclic shift sum determining section 164 and encoding section 151 via a signal line (not shown). Also, in cyclic shift sum determining section 164, the same content as set in cyclic shift sum calculating section 105 of a terminal is set in advance. That is, high interference power holds the relationship that the cyclic shift interval between cells is greater than the cyclic shift interval in a cell ($\Delta 1 < \Delta 2$), and low interference power holds the relationship that the cyclic shift interval between cells is equal to or less than the cyclic shift interval in a cell ($\Delta 1 \geqq \Delta 2$). Further, cyclic shift sum calculating section 164 calculates the sum of cyclic shifts from a cyclic shift sequence number and the values of $\Delta 1$ and $\Delta 2$ that are decided based on the magnitude of interference power.

(Embodiment 3)

A case will be explained with Embodiment 3 of the present invention where $\Delta 2 - \Delta 1$ is increased or decreased according to an increase or decrease of adjacent-cell interference to desired waves. Here, the function f of $\Delta 2 - \Delta 1 = f$ (1/inter-cell interference) is defined, and $\Delta 1$ and $\Delta 2$ are changed based on this relationship. For example, if $\Delta 1$ is fixed and $\Delta 2$ is variable, the following four types are defined.

Figure 13A:
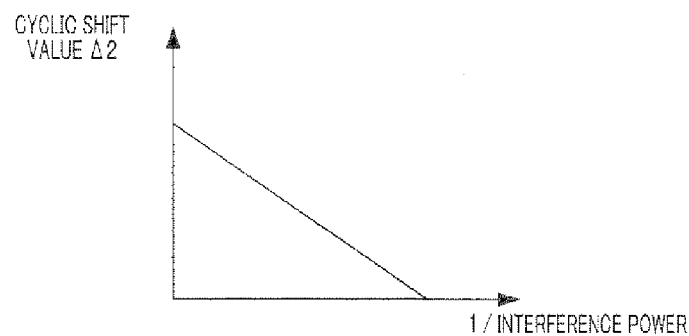
FIG. 13A illustrates a state where $\Delta 2$-$\Delta 1$ is increased or decreased according to an increase or decrease of interference between adjacent cells to desired waves (type 1)

First, FIG. 13A illustrates the first type. As shown in this figure, when interference power is smaller, the cyclic shift interval $\Delta 2$ becomes smaller. Also, when interference power is larger, the cyclic shift interval $\Delta 2$ becomes larger.

Figure 13B:
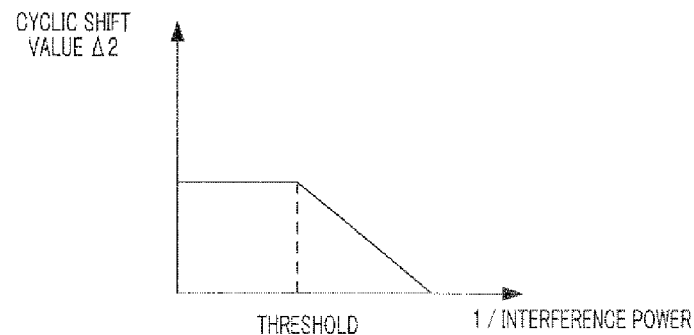
FIG. 13B illustrates a state where $\Delta 2$-$\Delta 1$ is increased or decreased according to an increase or decrease of interference between adjacent cells to desired waves (type 2)

Next, FIG. 13B illustrates the second type. As shown in this figure, when interference power is smaller, the cyclic shift interval $\Delta 2$ becomes smaller. Also, when interference power is larger, the cyclic shift interval $\Delta 2$ becomes larger. Here, a threshold is provided for 1/interference power, and the cyclic shift interval $\Delta 2$ is fixed at the maximum value when 1/interference power is equal to or less than the threshold.

Figure 13C:
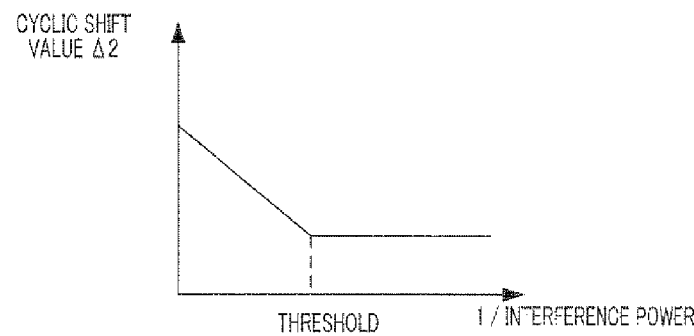
FIG. 13C illustrates a state where $\Delta 2$-$\Delta 1$ is increased or decreased according to an increase or decrease of interference between adjacent cells to desired waves (type 3)

Next, FIG. 13C illustrates the third type. As shown in this figure, when interference power is larger, the cyclic shift interval $\Delta 2$ becomes larger. Also, when interference power is smaller, the cyclic shift interval $\Delta 2$ becomes smaller. Here, a threshold is provided for 1/interference power, and the cyclic shift interval $\Delta 2$ is fixed at the minimum value when 1/interference power is greater than the threshold.

Figure 13D:
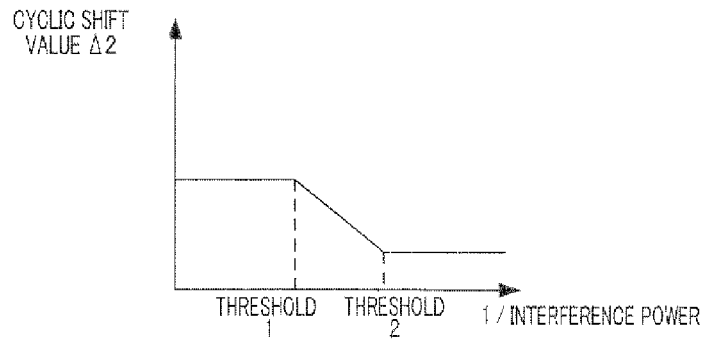
FIG. 13D illustrates a state where $\Delta 2$-$\Delta 1$ is increased or decreased according to an increase or decrease of interference between adjacent cells to desired waves (type 4).

FIG. 13D illustrates the fourth type. As shown in this figure, when interference power is larger, the cyclic shift interval $\Delta 2$ becomes larger. Also, when interference power is smaller, the cyclic shift interval $\Delta 2$ becomes smaller. Here, threshold 1 and threshold 2 (>threshold 1) are provided for 1/interference power, and the cyclic shift interval $\Delta 2$ is fixed at the maximum value when 1/interference power is equal to or less than threshold 1, and the cyclic shift interval $\Delta 2$ is fixed at the minimum value when 1/interference power is greater than threshold 2.

Here, although $\Delta 1$ is fixed and $\Delta 1$ is variable, it is equally possible to make $\Delta 2$ fixed and $\Delta 1$ variable. Also, both $\Delta 1$ and $\Delta 2$ can be fixed or made variable.

As described above, according to Embodiment 3, it is possible to alleviate interference between cells by increasing or decreasing the cyclic shift interval $\Delta 2$ and cyclic shift interval $\Delta 1$ based on an increase or decrease of interference between cells, where the cyclic shift interval $\Delta 2$ is the interval between cyclic shift sequences allocated between cells and where the cyclic shift interval $\Delta 1$ is the interval between cyclic shift sequences allocated in a cell.

Although example cases have been described above with embodiments using ZC sequences having an odd-numbered sequence length, the present invention is also applicable to ZC sequences having an even-numbered sequence length. Also, the present invention is applicable to GCL (Generalized Chirp Like) sequences including ZC sequences. Also, the present invention is also applicable to binary sequences and other CAZAC sequences using cyclic shift sequences or ZCZ sequences for code sequences. For example, there are Frank sequences, other CAZAC sequences (including sequences generated by a computer), and PN sequences such as M sequences and gold sequences.

Also, although example cases have been described above with embodiments using Zadoff-Chu sequences, the present invention is also applicable to modified Zadoff-Chu sequences acquired by cyclically extending or truncating Zadoff-Chu sequences. Generally, a ZC sequence having a sequence length N of a prime number cannot be adjusted to the number of subcarriers in the transmission band. Therefore, in order to adjust a ZC sequence having a sequence length N of a prime number to the number of subcarriers in the transmission band, studies are underway for the method of generating reference signals having the number of subcarriers in the transmission band by cyclically extending ZC sequences having a length of a prime number, and for the method of generating Zadoff-Chu sequences based on the number of subcarriers in the transmission band by cutting, that is, truncating ZC sequences having a length of a prime number. The present invention may be applicable to those modified ZC sequences subjected to cyclic expansion or truncation.

Also, although an example case has been described above where CAZAC sequences and their cyclic shift sequences are utilized as uplink reference signals, the present invention is not limited to this. The present invention is also applicable to cases where reference signals for uplink channel quality estimation, preamble sequences for random access and reference signals for downlink synchronization channels are transmitted in different transmission bands between cells using cyclic shifts.

Further, the present invention is also applicable to cases where a CAZAC sequence is used as a spreading code in code division multiplexing ("CDM") or in code division multiple access ("CDMA").

Also, although example cases have been described above with embodiments where a mobile station transmits data and reference signal to a base station, the present invention is applicable to cases of transmission from the base station to the mobile station.

Also, although the above embodiments have explained problems that are caused in ZC sequences of different bandwidths, the similar problems are caused in transmission bands of the same bandwidth (in which part of the transmission bands overlap). These problems can be solved by the above embodiments.

Although a case has been described above with the above embodiments as an example where the present invention is implemented with hardware, the present invention can be implemented with software.

Furthermore, each function block employed in the description of each of the aforementioned embodiments may typically be implemented as an LSI constituted by an integrated circuit. These may be individual chips or partially or totally contained on a single chip. "LSI" is adopted here but this may also be referred to as "IC," "system LSI," "super LSI," or "ultra LSI" depending on differing extents of integration.

Further, the method of circuit integration is not limited to LSI's, and implementation using dedicated circuitry or general purpose processors is also possible. After LSI manufacture, utilization of an FPGA (Field Programmable Gate Array) or a reconfigurable processor where connections and settings of circuit cells in an LSI can be reconfigured is also possible.

Further, if integrated circuit technology comes out to replace LSI's as a result of the advancement of semiconductor technology or a derivative other technology, it is naturally also possible to carry out function block integration using this technology. Application of biotechnology is also possible.

INDUSTRIAL APPLICABILITY

Even with cyclic shift sequences which have different bandwidths and which have high cross-correlation, the cyclic shift sequence generating method, radio communication terminal apparatus and radio communication base station apparatus according to the present invention can prevent interference waves from occurring in the detection windows for interference waves and improve the accuracy of channel estimation in the base station, and the method and apparatuses are applicable to, for example, mobile communication systems.

The invention claimed is:

1. A cyclic shift sequence transmission method comprising:
    generating a cyclic shift sequence based on a cyclic shift interval $\Delta 1$ between cyclic shift sequences of a Zadoff-Chu sequence allocated to a single cell and a cyclic shift interval $\Delta 2$ between cyclic shift sequences allocated between different cells between which frame synchronization is established; and
    transmitting the generated cyclic shift sequence, wherein:
    the cyclic shift interval $\Delta 1$ and the cyclic shift interval $\Delta 2$ are different from each other.

2. The cyclic shift sequence transmitting method according to claim 1, further comprising generating the cyclic shift sequence by fixing the cyclic shift interval $\Delta 1$ smaller than the cyclic shift interval $\Delta 2$.

3. The cyclic shift sequence transmitting method according to claim 1, further comprising generating the cyclic shift sequence by making the cyclic shift interval $\Delta 1$ smaller than the cyclic shift interval $\Delta 2$ when interference from an adjacent cell is greater than a predetermined value, and by making the cyclic shift interval $\Delta 1$ greater than the cyclic shift interval $\Delta 2$ when the interference from the adjacent cell is less than the predetermined value.

4. The cyclic shift sequence transmitting method according to claim 1, further comprising generating the cyclic shift sequence by making the cyclic shift interval $\Delta 1$ smaller than the cyclic shift interval $\Delta 2$ when a cross-correlation in a sequence group grouping cyclic shift sequences corresponding to a bandwidth is greater than a predetermined value, and by making the cyclic shift interval $\Delta 1$ greater than the cyclic shift interval $\Delta 2$ when the cross-correlation in the sequence group is less than the predetermined value.

5. The cyclic shift sequence transmitting method according to claim 1, further comprising generating the cyclic shift sequence by defining a relationship "f" between the cyclic shift interval $\Delta 1$ and the cyclic shift interval $\Delta 2$ as $\Delta 2 - \Delta 1 = f$.

6. A radio transmission apparatus comprising:
    a reference signal generating section that generates a cyclic shift sequence as a reference signal based on a cyclic shift interval $\Delta 1$ between cyclic shift sequences of a Zadoff-Chu sequence allocated to a single cell and a cyclic shift interval $\Delta 2$ between cyclic shift sequences allocated between different cells between which frame synchronization is established; and
    a transmitting section configured to transmit the generated reference signal, wherein:
    the cyclic shift interval $\Delta 1$ and the cyclic shift interval $\Delta 2$ are different from each other.

7. The radio transmitting apparatus according to claim 6, wherein the reference signal generating section is configured to calculate a sum of cyclic shifts that is equivalent to a sum of cyclic shift intervals between an allocated cyclic shift sequence and a reference cyclic shift sequence,
    based on the cyclic shift interval $\Delta 1$ and the cyclic shift interval $\Delta 2$, and to generate the cyclic shift sequence as the reference signal based on the sum of cyclic shifts calculated.

8. The radio transmission apparatus according to claim 6, wherein the reference signal generating section is configured to generate the cyclic shift sequence by making the cyclic shift interval Δ1 smaller than the cyclic shift interval Δ2.

9. The radio transmission apparatus according to claim 6, wherein the reference signal generating section is configured to generate the cyclic shift sequence by making the cyclic shift interval Δ1 smaller than the cyclic shift interval Δ2 when interference from an adjacent cell is greater than a predetermined value, and by making the cyclic shift interval Δ1 greater than the cyclic shift interval Δ2 when the interference from the adjacent cell is less than the predetermined value.

10. The radio transmission apparatus according to claim 6, wherein the reference signal generating section is configured to generate the cyclic shift sequence by making the cyclic shift interval Δ1 smaller than the cyclic shift interval Δ2 when a cross-correlation in a sequence group grouping cyclic shift sequences corresponding to a bandwidth is greater than a predetermined value, and by making the cyclic shift interval Δ1 greater than the cyclic shift interval Δ2 when the cross-correlation in the sequence group is less than the predetermined value.

11. The radio transmission apparatus according to claim 6, wherein the reference signal generating section is configured to generate the cyclic shift sequence by defining a relationship "f" between the cyclic shift interval Δ1 and the cyclic shift interval Δ2 as Δ2−Δ1=f.

* * * * *